United States Patent [19]
Forsyth

[11] Patent Number: 5,148,480
[45] Date of Patent: Sep. 15, 1992

[54] DECODER

[75] Inventor: Richard M. Forsyth, Bristol, United Kingdom

[73] Assignee: Inmos Limited, Bristol, England

[21] Appl. No.: 648,209

[22] Filed: Jan. 31, 1991

[30] Foreign Application Priority Data

Feb. 14, 1990 [GB] United Kingdom ............... 9003322

[51] Int. Cl.[5] .................................... G06F 7/50
[52] U.S. Cl. .................................... 380/28; 380/49;
364/739; 364/744; 364/746; 364/746.1; 364/771
[58] Field of Search .................. 340/146.2; 364/739,
364/744, 746, 746.1, 746.2, 754, 761, 771;
380/49, 59, 9, 28

[56] References Cited

U.S. PATENT DOCUMENTS

| | | | |
|---|---|---|---|
| 3,372,377 | 3/1968 | Cohn et al. ................ | 340/146.2 |
| 3,541,314 | 11/1970 | Webb ........................ | 340/146.2 X |
| 3,604,909 | 9/1971 | Vogel et al. ................ | 340/146.2 X |
| 3,694,642 | 9/1972 | Grannis ..................... | 340/146.2 X |
| 3,748,649 | 7/1973 | McEowen et al. .......... | 364/200 |
| 4,187,549 | 2/1980 | Bond et al. ................ | 364/746 |
| 4,810,995 | 3/1989 | Kondou et al. ............ | 340/146.2 |
| 4,873,660 | 10/1989 | Nishiyama et al. ......... | 364/746.2 X |
| 4,918,638 | 4/1990 | Matsumoto ................ | 364/746.1 |

OTHER PUBLICATIONS

"Evaluating A+B=K Conditions in Constant Time" by J. Cortadella and J. M. Llaberia. *ISCAS* (1988).

*Primary Examiner*—Bernarr E. Gregory
*Attorney, Agent, or Firm*—Edward D. Manzo

[57] ABSTRACT

A decoder having a plurality of outputs ($R_0-R_n$) each associated with a particular output valve is arranged to add together two binary numbers (A, B) and to select one of the outputs in dependence on the result of the sum. The decoder comprises a plurality of logic circuits each arranged to receive respective bits of both first and second binary numbers to be added together. The logic circuits are arranged to provide, for each output value, a respective result in dependence on the logic states of respective bits of binary numbers representing that particular output value of the decoder. The logic means determines when a predetermined condition is satisfied by the results of the logic circuits associated with an output value of the decoder, whereby that output value is selected.

14 Claims, 3 Drawing Sheets

DECODER

FIELD OF THE INVENTION

This invention relates to a decoder.

BACKGROUND OF THE INVENTION

There are several circumstances in the digital manipulation of numbers where it is required to perform an addition of two binary numbers and then decode the result. The term decode is used herein to denote the selection of a particular preset output value in dependence on the result of the addition. For example, the digital execution of long division involves a cycle of subtracting from a remainder REM held in register A a value M held in register B which is a whole multiple of the divisor D. In terms of hardware, the subtraction is performed in an adder by inverting the value M and adding the inverted value $-M$ to the remainder REM. The result X of the addition is passed to a look up table which decodes the result by comparing it with each of a plurality of integers (1-100) to determine a "match". The new value M stored against the matched value is then output to perform the next addition step. The result X becomes the next remainder REM for the subsequent cycle. This procedure is shown diagrammatically in FIG. 1.

In another example, a computer program frequently requires the loading of an instruction to a particular register which is identified in relation to a base register by an $(x+r)$-type instruction in the program, where r is the location of the base register and x the number to be added thereto to determine the location of the particular register. Firstly the addition $(x+r)$ must be performed and then the result of the addition must be supplied to a look up table to determine the output value associated with the result of the addition.

The execution of an addition followed by a decoding operation is costly in terms of time. It is an object of the present invention to increase the speed at which such operations can be executed and thereby improve the efficiency of processes using these steps.

SUMMARY OF THE INVENTION

According to the present invention there is provided a decoder having a plurality of outputs, each associated with a particular output value, and arranged to add together two binary numbers and to select one of said outputs in dependence on the result of said sum, the decoder comprising;

$n+1$ logic circuits, each arranged to receive the ith and $i-1$th bits (Ai, Ai$-1$, Bi, Bi$-1$) of first and second n bit numbers, where i is an index ranging from 1 to n and having one value in that range associated with each logic circuit, and each arranged to provide an output in dependence on the logic states of said bits and on the logic states of the ith and $i-1$th bits (Qi, Qi$-1$) of respective binary numbers which are the ones complement of binary numbers $R_{Ro} \ldots R_N$ representing each respective output value of the decoder in accordance with the following expression:

$Ai \oplus Bi \oplus Qi \oplus (Ai-1.Bi-1+Qi-1.$
$(Ai-1+Bi-1))$;

where Ai, Ai$-1$, Bi, Bi$-1$ are the ith and $i-1$th bits of the first and second binary numbers and Qi, Qi$-1$ are the ith and $i-1$th bits of said ones complement binary numbers, whereby a set of output signals is produced associated with each output value of the decoder, and logic means for identifying when that expression has a logic value of ONE for all the outputs of the logic circuits associated with an output value of the decoder, whereby that output value is selected. The index i=1 denotes the first (least significant) bit of each binary number, designated $A_o$, $B_o$ in the following description.

Preferably said logic means comprises a plurality of AND gates associated respectively with the outputs of the decoder and each arranged to receive the outputs of the $n+1$ logic circuits for each output value of the decoder.

In an embodiment which is particularly simple to construct each logic circuit is arranged to produce four outputs for each of the four possible alternative sets of Qi and Qi$-1$ by implementing for each of n bits of the binary numbers to be added the following expressions; where Qi=0, Qi$-1$=0 is written Q(0,0)

$Q(0,0)$  $Ai \oplus Bi \oplus (Ai-1 \cdot Bi-1)$ $Q(0,1)$  $Ai \oplus Bi \oplus (Ai-1+Bi-1)$ $Q(1,0)$  NOT $Ai \oplus Bi \oplus (Ai-1 \cdot Bi-1)$ $Q(1,1)$  NOT $Ai \oplus Bi \oplus (Ai-1+Bi-1)$ The appropriate Q values are fed into the AND gates associated with each output value in dependence on the output value.

For this embodiment, each logic circuit can comprise an NAND gate having first and second inputs for receiving the i-th bit (Ai$-1$,Bi$-1$) of each number; a NOR gate having first and second inputs for receiving the ith bit (Ai,Bi) of each number; a first exclusive OR gate having a first input coupled to the output of the NOR gate and a second input coupled to the output of a second exclusive OR gate whose inputs are the ith bit (Ai, Bi) of each number; a third exclusive OR gate having a first input coupled to the output of the NAND gate and a second input coupled to the output of the second exclusive OR gate; a first inverter coupled to the output of the first exclusive OR gate; a second inverter coupled to the output of the third exclusive OR gate, the output of the first and second inverter providing directly two of said four outputs the other two of said four outputs being provided by inverting said directly provided two outputs.

This implementation has the significant advantage of utilising only a few simple logic gates and enabling a combined add/decode operation to be carried out quickly.

It will be appreciated that the invention can be used in circumstances where more than two binary numbers are to be added together since circuits are available which can take three or four binary numbers and reduce them to two binary numbers which when added form the sum of the original three or four binary numbers. Such circuits do not form part of the present invention but are mentioned for the sake of completeness.

DESCRIPTION OF THE PREFERRED EMBODIMENT

Figure 1:
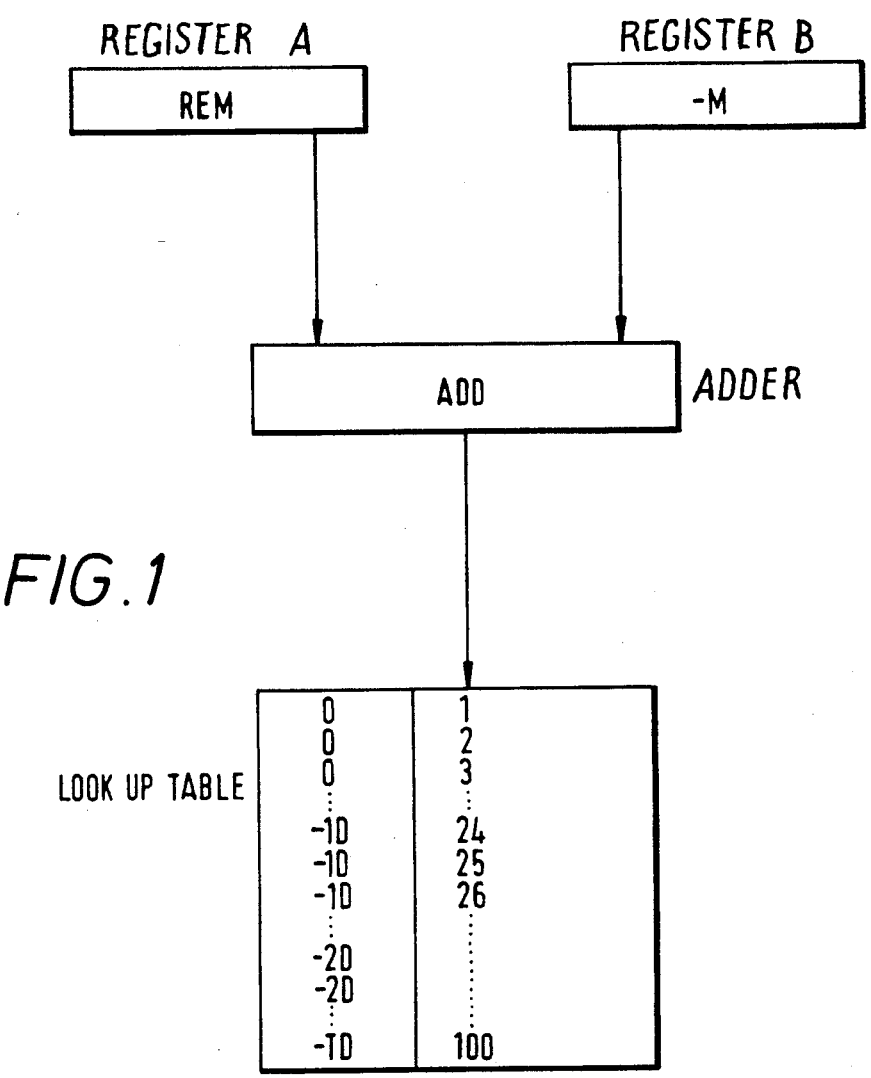
FIG. 1 is a block diagram of a prior art circuit for effecting long division.
Figure 2:
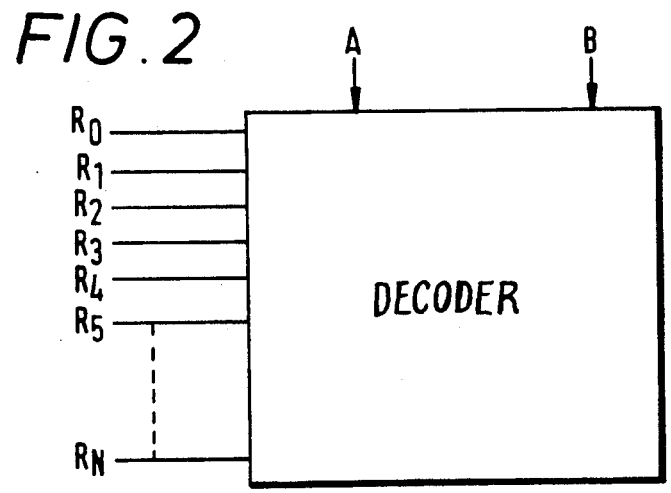
FIG. 2 is a block diagram illustrating the principles of the present invention.

For a better understanding of the present invention and to show how the same may be carried into effect reference will now be made by way of example to FIGS. 2 to 4 of the accompanying drawings.

Suppose that two binary numbers A and B (in two's complement), each having n bits, are to be added and the result decoded to select a particular output value R. The invention provides a single circuit 10 to effect this as shown in block diagram in FIG. 2. That is, a decoder receives two separate binary numbers A and B and selects an output value from its outputs Ro-RN depending on the result of adding A and B.

For the correct output value of the decoder Rx for two particular numbers A, B $$A \text{ plus } B = Rx \qquad \text{(Equation 1)}$$

hence $$A \text{ plus } B \text{ minus } Rx = 0 \qquad \text{(Equation 2)}$$

The output values Ro to RN are preset so for each case Rx is a fixed constant. A normal decoder has $N = 2^n$ outputs for a binary number having n bits. The present decoder can have any number $N \leq 2^n$ with each output value Rx being different, increasing from 0 to $N-1$.

Consider the ones complement Q of R. That is Q is a binary number corresponding to R but with all the bits inverted. In logic terms. It will be understood, however, that the decoder does not actually perform addition but manipulates data in order to produce a value that does indeed correspond to the "sum" of A and B.

$$Q = -(R \text{ plus } 1) \qquad \text{(Eq. 3)}$$

hence $$A \text{ plus } B \text{ plus } Q = -1 \qquad \text{(Eq. 4)}$$

In two's complement binary notation, $-1$ is written 11111. . . .

Consider the sum Si of each bit i from 0 to $n-1$ of the left hand side of equation (4). Herein the term $+$ is logic OR, the term . is logic AND, and the term $\oplus$ is logic EXCLUSIVE OR.

$$S_i = A_i \oplus B_i \oplus Q_i \qquad \text{(Eq. 5)}$$

The carry for each bit is $$C_i = A_i \cdot B_i + Q_i \cdot (A_i + B_i) \qquad \text{(Eq. 6)}$$

To obtain the final result a further addition is required $$S \text{ plus } C * 2$$

where $C*2$ denotes a shift to the left, i.e. Si and $C_{i-1}$ have the same significance.

When the two binary numbers S and 2*C are added together, the result, X is formed from $$X_i = S_i \oplus C_{i-1} \oplus Y_{i-1} \qquad \text{(Eq. 7)}$$

where Y is the carry in from respective stages:

$$Y_i = S_i \cdot C_{i-1} + Y_{i-1} \cdot (S_i + C_{i-1}) \qquad \text{(Eq. 8)}$$

If we assume that for $Y_{i-1} = 0$, and $X_i = 1$, then $$S_i \oplus C_{i-1} = 1 \qquad \text{(Eq. 9)}$$

This implies that either $S_i = 0$ or $C_{i-1} = 0$ which means that $$S_i \cdot C_{i-1} = 0 \qquad \text{(Eq. 10)}$$

and so $Y_i = 0$. We define $Y_{-1} = 0$, so by induction, $Y_i = 0$ for every value of i. This shows that the carry values $Y_i$ are all zero, and so only equation (10) needs to be evaluated, with $Y_{i-1} = 0$.

Substituting values for Si and $C_{i-1}$ from equations (5) and (6) into equation (10) yields:

$$A_i \oplus B_i \oplus Q_i \oplus (A_{i-1} \cdot B_{i-1} + Q_{i-1} \cdot (A_{i-1} + B_{i-1})) = 1. \qquad \text{(Eq. 11)}$$

Figure 3:
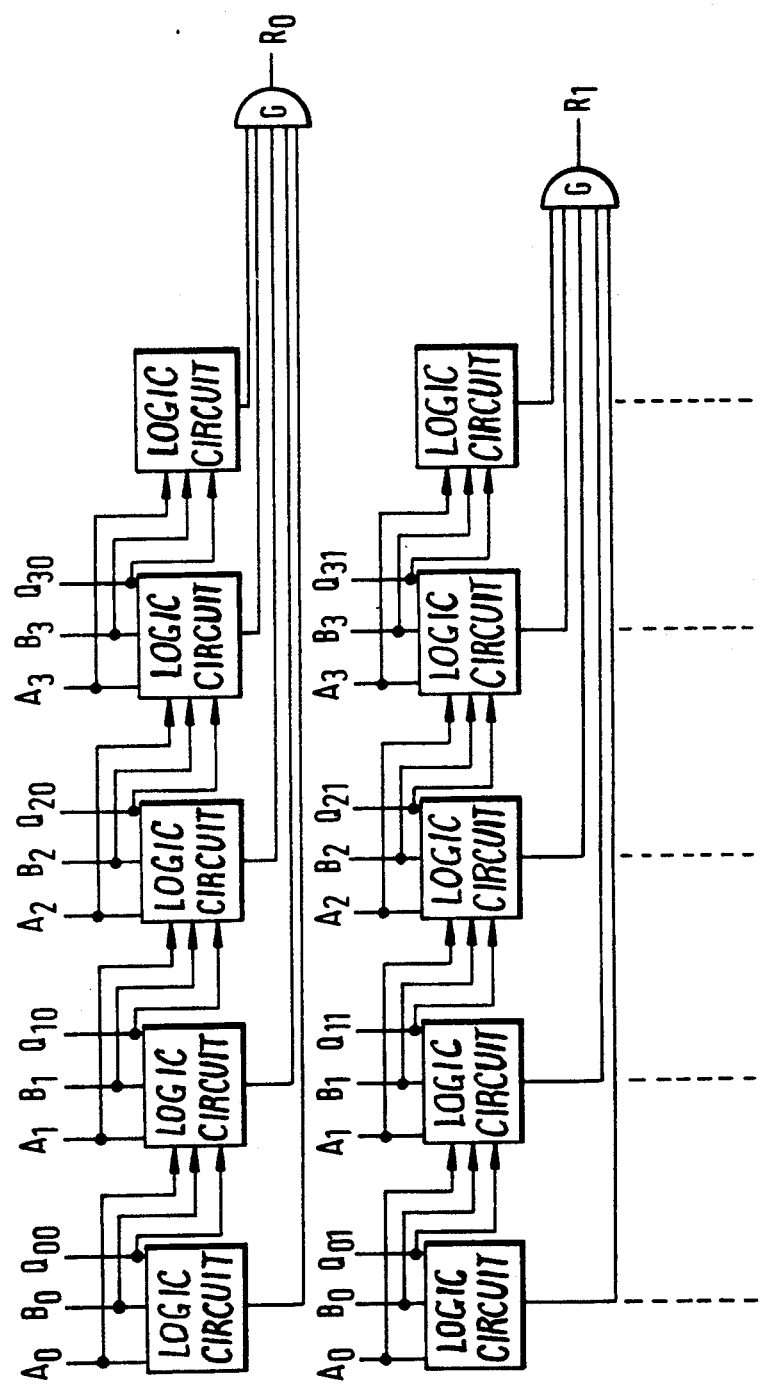
FIG. 3 is a block diagram of one embodiment of the present invention.

Referring to FIG. 3, this equation can be implemented in hardware by providing for each output Rx of the decoder a plurality of logic circuits L (five are shown for each of two outputs in FIG. 3—generally there are $n+1$ for adding two n bit binary numbers), each receiving the inputs Ai, Bi, Qi, Ai−1, Bi−1 and Qi−1 and arranged to execute the simple logic functions expressed in the left hand side of equation 10. The outputs of the plurality of logic circuits associated with each output of the decoder are supplied to an AND gate G. When the output of any particular AND gate is HIGH, that signifies that equation 1 is true for that output. Consider for illustrative purposes that the output R of the decoder of FIG. 2 is a 4-bit number. More generally, the outputs R range from 0 to $2^n - 1$ where n is the number of bits of A or B. So if A is a 4-bit number, and B is also a 4-bit number, the sum of A and B will be a 4-bit number with the possibility of a carry bit. Four binary bits in a number of course means that 16 different values can be represented by those four bits. So we may assign the first R output $R_0$ to the base ten (digital) value "1", the second R output $R_1$ to the digital value "2", and so on.

Thus it will be appreciated that because each output $R_x$ is known, likewise its one's complement is known. We refer to the one's complement as Q, as already pointed out. Now, the one's complement Q has several bits, illustratively four bits. To designate a particular bit in a value Q, the notation we follow first designates the underlying R output and then designates the number of the bit. In FIG. 3, the notation Qix indicates the ith bit of the ones complement Qx of the output Rx. For example Q11 is the second bit of the ones complement of the second output $R_1$. Likewise, in FIG. 3, the symbol Q21 designates the third bit of the one's complement of the second output $R_1$.

As can be seen from FIG. 3, in each column the same logic values are fed to each of N logic circuits and the same logic manipulations executed thereupon. The only change moving from row to row down a common column is the logic value of Qix.

However, this is preset for each decoder, normally in numerical progression, for example (with the numbers in parentheses being binary representations) $R_o = 0$ (0000, $Q_0 = 1111$); $R_1 = 1$ (0001, $Q_1 = 1110$); $R_2 = 2$ (0011, $Q_2 = 1100$) etc. up to $R_N$ 15 for a four bit number. Hence the values for Qix are known prior to the design of any particular decoder using equation (10) and can be used to produce logic circuits for determining the left hand side of equation 10 in four specific cases of Qi, Qi−1 (where Qi=0,Qi−1=0 is written as Q(0,0) etc.).

Figure 4:
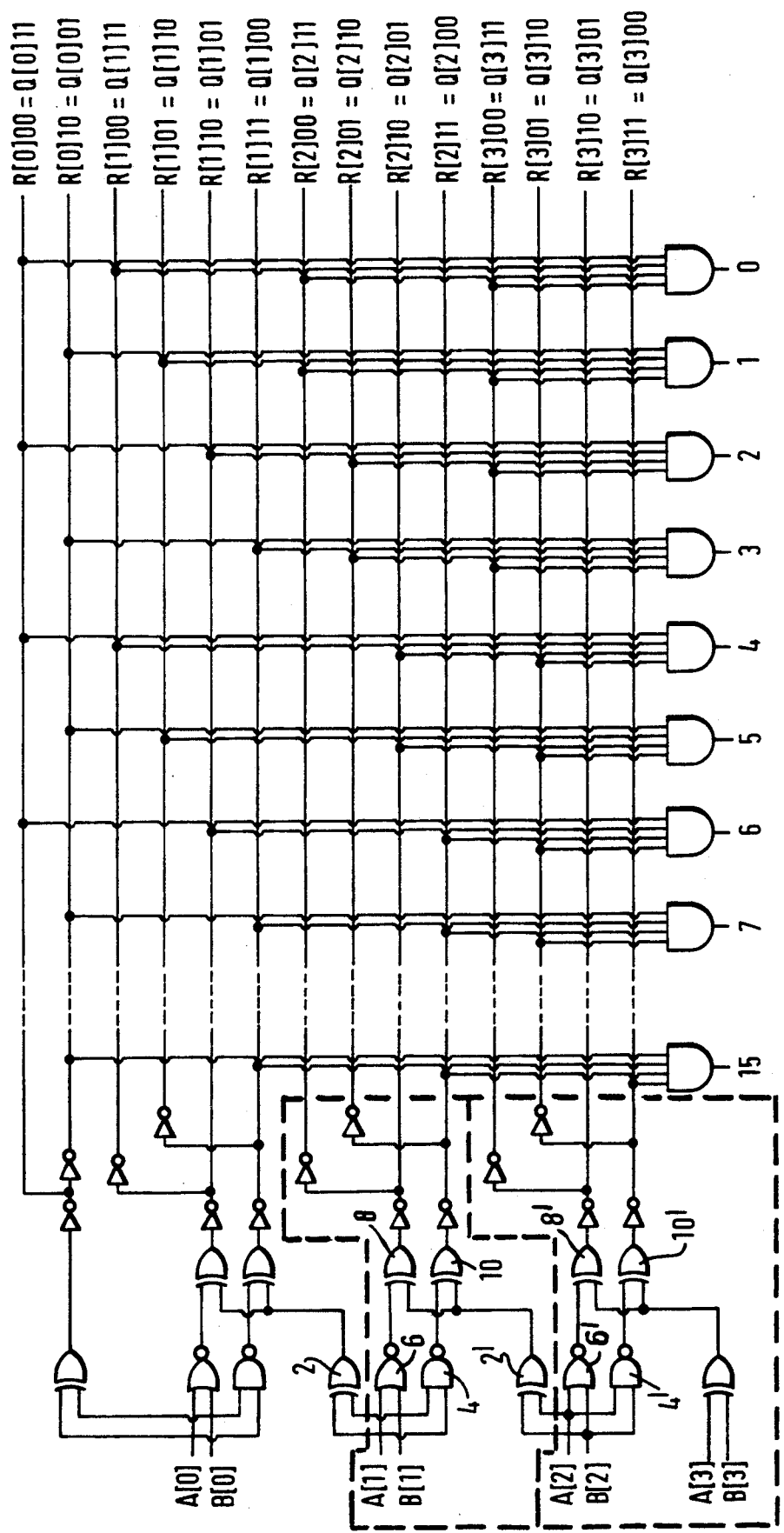
FIG. 4 is a circuit diagram of one embodiment of the present invention.

$Q(0,0)$ $Ai \oplus Bi \oplus (Ai - 1 \cdot Bi - 1)$ $Q(0,1)$ $Ai \oplus Bi \oplus (Ai - 1 + Bi - 1)$ $Q(1,0)$ NOT $Ai \oplus Bi \oplus (Ai - 1 \cdot Bi - 1)$ $Q(1,1)$ NOT $Ai \oplus Bi \oplus (Ai - 1 + Bi - 1)$ The implementation of this circuitry is shown partially in FIG. 4, where eight outputs are shown for decoding the sum of two four bit words.

The circuit in FIG. 4 shows only part of the complete circuitry, the logic circuits being illustrated in their complete form only for inputs $A_1,B_1$ and $A_2,B_2$. Inputs $A_1$ and $B_1$ are fed to each of an exclusive OR gate 2 a NAND gate 4 and a NOR gate 6. Inputs $A_2$ and $B_2$ are fed to a similar arrangement of gates 2',4',6' as are inputs $A_o,B_o$ and $A_3,B_3$ although the complete arrangement of gates for these inputs is not shown in FIG. 4. An exclusive OR gate receives the output of the NAND gate 4 and the exclusive OR gate 2', while an exclusive OR gate 10 receives the output of the NOR gate 6 and the exclusive OR gate 2'. The outputs of these exclusive OR gates 8,10 are used directly and inverted to form the Q terms Q(0,0), Q(0,1), Q(1,0), Q(1,1) for the case i=3, i−1=2. These are then fed in different combinations (according to the appropriate output value) to output NAND gates G.

What is claimed is:

1. A decoder having first and second inputs and a plurality of outputs, each associated with a particular output value, and having selection circuitry coupled between said first and second inputs and arranged to select one of said outputs based on a relationship between first and second n-bit binary numbers A and B supplied to said first and second inputs respectively, said selecting circuitry comprising:

a plurality of logic circuits, each corresponding to an index value i, where i ranges from 1 to n, each of the logic circuits being coupled to receive the ith and (i−1)th bits of said first and second n bit numbers, and each arranged to provide an output signal based on the logic states of said bits and on the logic states of the ith and (i−1)th bits of respective binary numbers Q which are the one's complement of binary numbers $R_o \ldots R_N$ representing each respective output value of the decoder in accordance with the following expression:

$Ri = Ai \oplus Bi \oplus Qi \oplus (Ai-1.bi-1+Qi-1.(Ai-1-+Bi-1))$ where Ai, Ai−1, Bi, Bi−1 are the ith and (i−1)th bits of the first and second binary numbers, and Qi, Q(i−1) are the ith and (i−1)th bits of said one's complement binary numbers, whereby a set of output signals is produced associated with each output value of the decoder; and logic means coupled to said logic circuits for identifying when that expression has a logic value of ONE for all the output signals in a set, whereby the output value associated with that set is selected.

2. A decoder as claimed in claim 1, wherein said logic means comprises a plurality of AND gates associated respectively with the outputs of the decoder and each arranged to receive the set of output signals of the logic circuits for each output value of the decoder.

3. A decoder as claimed in claim 1 or 2 wherein each logic circuit comprises logic gates arranged to produce four outputs for each of the four possible alternative sets of Qi and Qi−1 by implementing the following expressions; where Qi=0, Qi−1=0 is written Q(0,0)

$Q(0,0)$ $Ai \oplus Bi \oplus (Ai - 1 \cdot Bi - 1)$ $Q(0,1)$ $Ai \oplus Bi \oplus (Ai - 1 + Bi - 1)$ $Q(1,0)$ NOT $Ai \oplus Bi \oplus (Ai - 1 \cdot Bi - 1)$ $Q(1,1)$ NOT $Ai \oplus Bi \oplus (Ai - 1 + Bi - 1)$.

4. A decoder having first and second inputs and a plurality of outputs, each associated with a particular output value, and having selection circuitry coupled between said first and second inputs and arranged to select one of said outputs based on a relationship between first and second n-bit binary numbers supplied to said first and second inputs respectively, said selecting circuitry comprising:

a plurality of logic circuits, each comprising:

a NAND gate having first and second inputs for receiving the i−1th bit of each of said n-bit binary numbers, where i is an index ranging from 1 to n wherein each value in that range is associated with a corresponding one of said logic circuits;

a NOR gate having first and second inputs for receiving the i−1th bit of each binary number;

first and second exclusive OR gates, the first exclusive OR gate having a first input coupled to the output of the NOR gate and a second input coupled to the output of the second exclusive OR gate, the inputs to which include the ith bit of each of said n-bit binary numbers; and a third exclusive OR gate having a first input coupled to the output of the NAND gate and a second input coupled to the output of the second exclusive OR gate, a first inverter coupled to the output of the first exclusive OR gate, a second inverter coupled to the output of the third exclusive OR gate, the outputs of the first and second inverters directly providing respectively two output signals of the logic circuit and being inverted to provide two further output signals of the logic circuit so as to provide a set of output signals associated with each output value of the decoder; and a plurality of AND gates associated respectively with the outputs of the decoder and each arranged to receive one of said sets of output signals associated with each output value of the decoder.

5. A method of selecting one of a plurality of outputs R of a decoder, each output being associated with a particular output value based on a relationship of first and second n-bit binary numbers Ai, Bi, where i is an index ranging from 1 to n, the method comprising the steps of:

supplying the ith and the (i−1)th bits of said first and second binary numbers to each of a plurality of logic circuits, each logic circuit being associated with a respective index i, each said logic circuit arranged to provide an output signal based on the logic states of its inputs in accordance with the following expression:

$$Ri = Ai \oplus Bi \oplus Qi \oplus (Ai-1.Bi-1 + Qi-1.(Ai-1 + Bi-1))$$

where Ai, Ai−1, Bi, Bi−1 are the ith and (i−1)th bits of the first and second binary numbers and Qi, Q(i−1) are the ith and (i−1)th bits of one's complement binary numbers of $R_o$... $R_N$, which are binary numbers representing each respective output value whereby a set of output signals is produced associated with each output value of the decoder; and identifying when that expression has a logic value of ONE for all the output signals in a set whereby the output value associated with that set is selected.

6. A method as claimed in claim 5 wherein the output signals of the logic circuits associated with a output value are supplied to a plurality of AND gates associated respectively with the said outputs.

7. A method of generating a decoder output signal associated with a particular n-bit value R when the sum of n-bit input values A and B is equal to R, the method comprising:

generating an n-bit value Q as the one's complement of the value R;

generating an n-bit value S in accordance with the equation $Si = Ai \oplus Bi \oplus Qi$, where i is an index ranging from 1 to n and where $\oplus$ is an Exclusive OR function;

generating an n-bit value C in accordance with the equation $$Ci = Ai.Bi \oplus Qi.(Ai \oplus Bi); \text{ and}$$

activating the decoder output signal when the equation Si.Ci−1= is satisfied for all values of i.

8. The method as claimed in claim 7 wherein the activating step includes detection of the expression $Si \oplus Ci-1$.

9. A decoder providing an output signal associated with a particular n-bit value R when the sum of n-bit input values A and B is equal to R, comprising:

a source of an n-bit value Q as the bit-wise complement of the value R;

a logic circuit configured to generate an n-bit value S in accordance with the equation $$Si = Ai \oplus Bi \oplus Qi,$$

where i is an index ranging from 1 to n and $\oplus$ is an Exclusive OR function;

the logic circuit also configured to generate an n-bit value C in accordance with the equation $$Ci = Ai.Bi + Qi.(Ai \oplus Bi);$$

the decoder being responsive to the condition when the equation Si.Ci−1=0 is satisfied for all values of i to output a signal.

10. The decoder as claimed in claim 9 wherein the logic circuit also detects the expression $Si \oplus Ci-1$.

11. A method of decoding based on combining first and second n-bit binary numbers A and B and selecting an output value R corresponding to a sum, comprising the steps of:

determining the one's complement values of selected combinations of said outputs R;

logically combining the ith and (i−1)th bits of said binary numbers A and B (where i is an index from 1 to n) with corresponding ones of said one's complement values, thus producing a plurality of first combinations;

combining selected groups of said first combinations to produce second combinations; and selecting one of a set of outputs R which are selectively actuable on the basis of the second combinations, and applying an output signal thereto.

12. A decoder for generating an output signal representative of a sum of two binary numbers without actually computing said sum, the decoder comprising:

first and second input terminals for receiving respectively the two binary numbers;

a plurality of output terminals each representing a respective value; and logic circuitry for providing an output signal to one of said output terminals based on a logical manipulation of the two binary numbers and said respective values to select the one of said values which is representative of a sum of said first and second binary numbers, without computing said sum.

13. A method of generating a decoder output signal associated with a particular n-bit value R when the sum of n-bit input values A and B is equal to R, the method comprising:

generating an n-bit value S in accordance with the equation $Si = Ai \oplus Bi \oplus Qi$, where Q is the one's complement of the value R, i is an index ranging from 1 to n and where $\oplus$ is an Exclusive OR function;

generating an n-bit value C in accordance with the equation $$Ci = Ai.Bi \oplus Qi.(Ai \oplus Bi); \text{ and}$$

activating the decoder output signal when the equation Si.Ci−1=0 is satisfied for all values of i.

14. The method as claimed in claim 13 wherein the activating step includes detection of the expression $Si \oplus Ci-1$.

* * * * *